Figure 1:
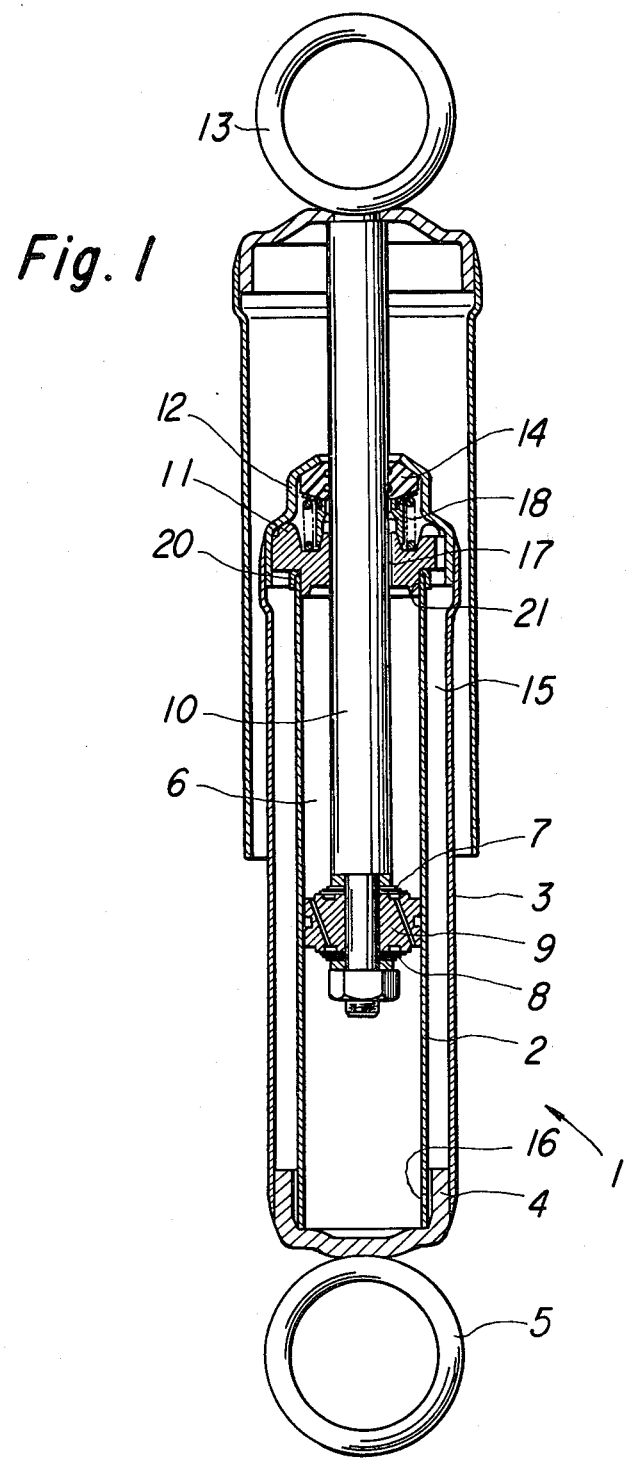

United States Patent [19]

Miura

[11] 4,386,686
[45] Jun. 7, 1983

[54] HYDRAULIC SHOCK ABSORBER

[75] Inventor: Ieaki Miura, Yokohama, Japan

[73] Assignee: Tokico Ltd., Kawasaki, Japan

[21] Appl. No.: 221,070

[22] Filed: Dec. 29, 1980

[30] Foreign Application Priority Data

Jan. 8, 1980 [JP] Japan .................................. 55-579

[51] Int. Cl.³ .............................................. F16F 9/00
[52] U.S. Cl. .............................................. 188/322.17
[58] Field of Search ...................... 188/322.16, 322.17, 188/322.18, 269, 312, 314, 318

[56] References Cited

U.S. PATENT DOCUMENTS

| 3,958,673 | 5/1976 | Allinquant et al. | 188/322.17 X |
| 4,189,033 | 2/1980 | Katsumori | 188/322.17 X |
| 4,240,531 | 12/1980 | Postema | 188/322.17 X |

FOREIGN PATENT DOCUMENTS 52-13392 1/1977 Japan .
53-124996 10/1978 Japan .

Primary Examiner—Duane A. Reger
Attorney, Agent, or Firm—Wegner & Bretschneider

[57] ABSTRACT

A hydraulic shock absorber wherein a seal ring is provided between an inner cylinder and a piston rod guide so as to seal the gap between the inner cylinder and the piston rod guide of the hydraulic shock absorber.

9 Claims, 3 Drawing Figures

HYDRAULIC SHOCK ABSORBER

This invention relates to a hydraulic shock absorber and, more specifically, it relates to a double cylinder type gas-containing hydraulic shock absorber. Known hydraulic shock absorber of this type comprises an inner cylinder and an outer cylinder, in which a piston is slidably fitted within the inner cylinder and connected to a piston rod. The inner cylinder and the outer cylinder have, attached on one ends, a closing member such as a cap and also, attached on the other ends, a rod guide and a cap member. The piston rod projects externally passing through the rod guide and the cap member.

In the hydraulic shock absorber of the above mentioned structure, gas is encapsulated within an annular chamber defined between the inner cylinder and the outer cylinder, and the pressure of the gas in the annular chamber is increased when the hydraulic shock absorber is contracted. This may cause the gas to flow through the gap between the rod guide and the piston rod, as well as between the inner cylinder and the rod guide into the chamber within the inner cylinder. In order to prevent the gas encapsulated in the annular chamber from flowing into the chamber within the inner cylinder, a check valve has been provided between the cap member and the rod guide and an O-ring or a spring washer has been mounted between the inner cylinder and the rod guide in the conventional hydraulic shock absorber.

In the case where the O-ring is used, it is however necessary to form a groove on the circumferential surface of the rod guide for mounting the O-ring therein and the fabrication of such a groove presents a measure factor for the increase in the cost of the hydraulic shock absorber. While on the other hand, in the use of the spring washer, the rod guide has to be engaged to the inner cylinder with the washer previously mounted on its end face, wherein the spring washer often falls down from the end face of the inner cylinder upon engagement, thereby consuming much working time for assembling the hydraulic shock absorber.

This invention has been made in view of the foregoing drawbacks in the prior art and the object thereof is to provide a hydraulic shock absorber which can prevent the flowing of the encapsulated gas through the gap between the inner cylinder and the rod guide into the chamber within the inner cylinder to thereby always produce predetermined desired damping or shock absorbing effect, improve the efficiency in assembling work and reduce the manufacturing cost.

The hydraulic shock absorber according to this invention comprises an inner cylinder filled with hydraulic fluid, an outer cylinder surrounding said inner cylinder for defining an annular reservoir in association with said inner cylinder, said reservoir being filled with hydraulic fluid and gas, a piston provided in a chamber in the inner cylinder, a piston rod passing through a rod guide and seal member, one end of said piston rod being secured to said piston, a seal ring held between rod guide and inner cylinder, said seal ring having a cylindrical part, said cylindrical part covering the circumferential surface of the inner cylinder, which is adjacent to the face on the end of the inner cylinder.

According to the hydraulic shock absorber of this invention having the foregoing constitution, since a seal ring in a configuration kept to be secured on the inner cylinder is used, detaching and falling of the seal ring from the inner cylinder during the assembling work or the like is eliminated, by which the workability can be improved. Further, in the case where the seal ring is made of relatively soft material, it allows the inner cylinder to be forced considerably into the seal ring, by which reliable sealing can be obtained even if the surface of the cylinder and/or the rod guide has remarkable injuries or undulations. Moreover, sealing can be attained with no particular fabrication to the rod guide and the like such as forming of the engaging grooves in the case of using O-ring and the seal ring itself can be produced by way of press or the like with ease, which significantly reduces the manufacturing cost as compared with that for the conventional shock absorber.

Figure 2:
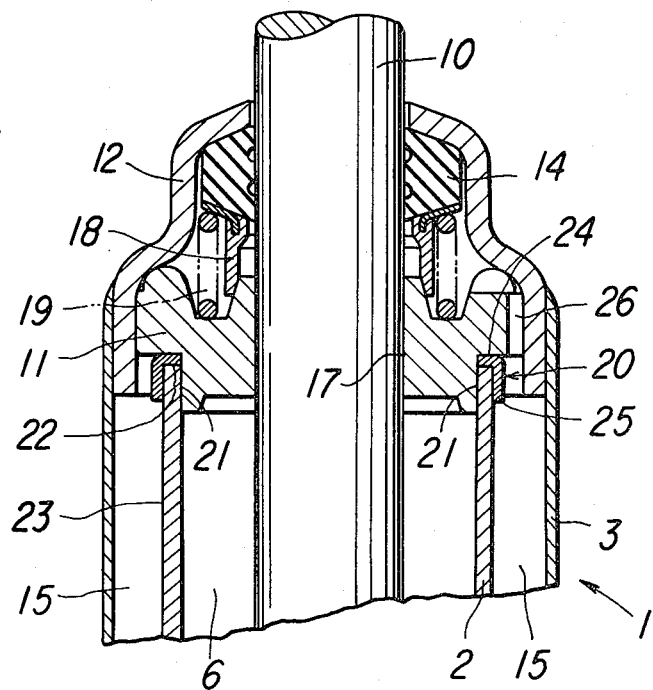
Figure 3:
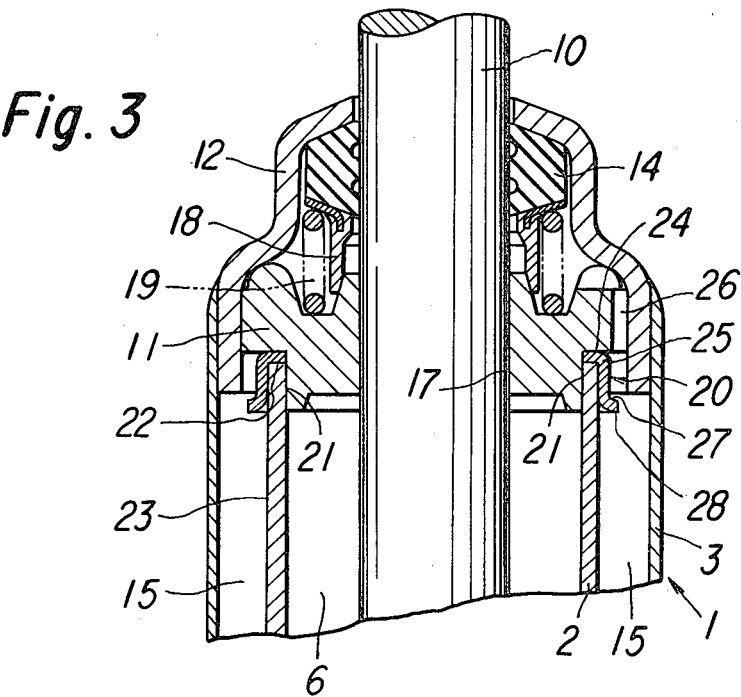

This invention is to be explained by way of its preferred embodiments referring to the drawings, wherein FIG. 1 is a cross sectional view for one preferred embodiment of the hydraulic shock absorber according to this invention;

FIG. 2 is an enlarged view for a part of the shock absorber shown in FIG. 1; and FIG. 3 is an enlarged view for a part of another embodiment of the hydraulic shock absorber according to this invention.

As shown in FIG. 1 and FIG. 2, a double cylinder type gas-containing hydraulic shock absorber 1 comprises an inner cylinder 2 and an outer cylinder 3, wherein the cylinders 2 and 3 are mounted on respective one ends thereof with a cap 4 as the closing member, by which they are closed to the outer side in an air tight manner. The cap 4 has a mounting ring 5 secured thereto. A rod guide 11 and a cap member 12 are mounted on the other respective ends of the cylinders 2 and 3. A piston 9 having valves 7 and 8 is slidably engaged relative to the inner cylinder 2 within the chamber 6 in the cylinder 2 of the shock absorber 1, and the piston 9 is connected with a piston rod 10, which projects externally passing through the rod guide 11 and the cap member 12 and has, at its outer projection end, a mounting ring 13 secured thereto. The shock absorber 1 can be mounted by means of the mounting rings 5 and 13 to an appropriate location of a vehicle or the like.

A through hole 16 as communicating means is perforated in the lower portion of the inner cylinder for communicating the chamber 6 with the reservoir 15 which is defined with the inner and the outer cylinders 2 and 3 as the annular chamber, and the shock absorber 1 is adapted such that the hydraulic fluid in the reservoir 15 can flow into and out of the chamber 6 upon sliding of the piston 9. A seal member 14 is provided within the cap member 12 on the circumference of the rod 10 so as to prevent the gas and the hydraulic fluid encapsulated in the chamber 6 and the reservoir 15 from leaking externally. A check valve 18 is provided held on the spring 19 between the packing 14 and the rod guide 11. The check valve 18 allows the gas or the hydraulic fluid to flow out of the chamber 6 by way of the gap 17 to the reservoir 15 on one hand and inhibits the gas or the hydraulic fluid from flowing out of the reservoir 15 by way of the gap 17 into the chamber 6 on the other hand.

In this embodiment, a seal ring 20 is provided held between the rod guide 11 and the cylinder 2 for preventing the gas in the reservoir 15 from flowing out by way of the gap 21 between the inner cylinder 2 and the rod guide 11 into the chamber 6. The seal ring 20 has such a configuration as covering the one end face 22 of the inner cylinder 2 and the outer circumferential surface 23 of the cylinder 2 adjacent to the one end face 22 and it, preferably, comprises an annular flat part 24 and a cylindrical part 25 integrated with and extending vertically from the outer circumference of the annular flat part 24. The inner diameter of the annular flat part 24 is equal to the inner diameter of the inner cylinder 2 and the inner circumferential surface of the cylindrical part 25 fits to the outer circumferential surface 23 of the inner cylinder 2. The seal ring 20 is, preferably, made of soft non-ferrous metals such as aluminum and copper and can be formed by way of press.

In the hydraulic shock absorber 1 having the foregoing constitution, when the shock absorber 1 is contracted and the piston 9 is moved downwardly, the pressure in the reservoir 15 is increased since the hydraulic fluid in the chamber 6 flows by way of the through-hole 16 into the reservoir 15. Accordingly, the gas encapsulated in the reservoir 15 tends to flow into the chamber 6 through the gap 17 between the rod guide 11 and the rod piston 10, as well as the gap 21 between the inner cylinder 2 and the rod guide 11. However, such a flow of the gas to the chamber 6 can be inhibited completely by the presence of the check valve 18 and the seal ring 20.

Further, since the seal ring 20 is previously secured to the inner cylinder 2 by being pressed to one end of the cylinder 12, the assembling work for the hydraulic shock absorber can surely be conducted without being troubled by the falling and detaching of the seal ring from the cylinder 2 during the assembling work. Moreover, since the end face 22 of the inner cylinder 2 is forced into the seal ring 20 upon fitting of the rod guide 11 to the cylinder 2, a substantially complete sealing is formed preventing the gas in the reservoir 15 from flowing into the chamber 6 by way of the gap 21 even when the pressure in the reservoir 15 is increased due to the downward movement of the piston 9. In addition, the check valve 18 inhibits the flow of the gas and the hydraulic fluid from the reservoir 15 to the chamber 6 by way of the channel 26 provided to the rod guide 11 and the gap 17 into the chamber 6 on one hand and allows a gas generated in the chamber 6 and leaked by way of the gap 17 and the hydraulic fluid leaked from the chamber 6 by way of the gap 17 to return to the reservoir 15 by way of the check valve 18 and the channel 26 on the other hand.

In another embodiment of the hydraulic shock absorber according to this invention shown in FIG. 3, an annular guide 28 is integrally formed on the lower end 27 of the cylindrical part 25 of the seal ring 20, and the diameter of the annular guide 28 is gradually increased from the lower end 27 downwardly. By the provision of the annular guide 28, the seal ring 20 is smoothly guided by means of the inner tapered surface of the annular guide 28 and can surely be mounted on the outer circumferential surface 23 of the inner cylinder 2 upon mounting of the seal ring 20 to the cylinder 2.

Further, in the hydraulic shock absorber according to this invention, gas is encapsulated within the reservoir 15, said gas being kept under the pressure of 6–15 kg/cm$^2$. Since the shock absorber of this invention is designed in such a way that the through-hole 16 brings a throttling effect, it doesn't require a bottom valve. But this invention is not limited to that design, but may be applied to the conventional shock absorber with a bottom valve or the shock absorber of any other type.

Furthermore in the hydraulic shock absorber according to this invention, even if the seal ring is not used the inner cylinder can secure the rod guide applied when the seal ring is used.

What is claimed is:

1. A hydraulic shock absorber, comprising:
    an inner cylinder filled with hydraulic fluid;
    an outer cylinder surrounding said inner cylinder for defining an annular reservoir therebetween, said reservoir being filled with hydraulic fluid and gas;
    a piston provided in a chamber in the inner cylinder;
    a piston rod passing through a rod guide and a seal member, one end of said piston rod being secured to said piston; and
    a seal ring pressed and tightly held between the rod guide and one end of the inner cylinder, said seal ring having an annular flat part and a cylindrical part integral with the outer circumference of the annular flat part and extending perpendicular to the annular flat part, the inner diameter of said annular flat part being equal to the inner diameter of the inner cylinder and the inner circumferential surface of said cylindrical part fitting to the outer circumferential surface of the inner cylinder to cover the outer circumferential surface adjacent to the end face of said one end of the inner cylinder.

2. The hydraulic shock absorber of claim 1, in which gas is encapsulated within said annular reservoir, said gas being kept under pressure.

3. The hydraulic shock absorber of claim 1, which further comprises means for communicating the chamber in the inner cylinder with the annular reservoir, said means disposed remote from said one end of the inner cylinder and adapted to produce a throttling effect.

4. The hydraulic shock absorber of claim 1, in which a check valve is provided between the seal member and the rod guide surrounding the piston rod, the check valve being adapted to inhibit the gas in the annular reservoir from flowing into the chamber of the inner cylinder by way of a gap between the rod guide and the piston rod.

5. The hydraulic shock absorber of claim 1, in which the seal ring has a guide integral with the end of the cylindrical part and gradually enlarging therefrom in diameter.

6. The hydraulic shock absorber of any one of claims 1 to 4, in which the seal ring is made of nonferrous metal.

7. The hydraulic shock absorber of any one of claims 1 to 4, in which the seal ring is made of aluminum.

8. The hydraulic shock absorber of any one of claims 1 to 4, in which the seal ring is made of copper.

9. The hydraulic shock absorber of any one of claims 1 to 4, in which the seal ring is formed by press.

* * * * *